United States Patent Office 2,870,515
Patented Jan. 27, 1959

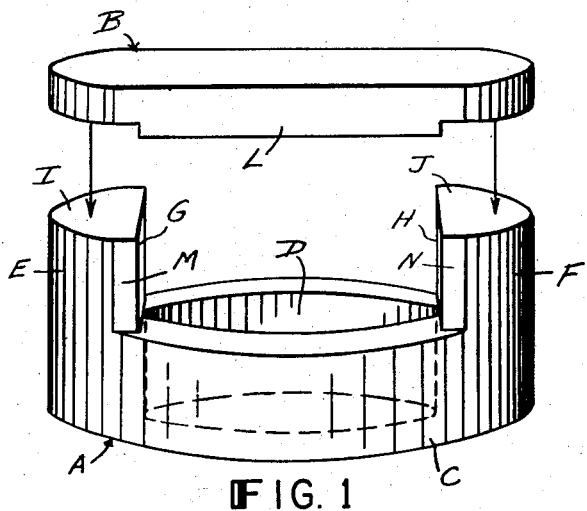
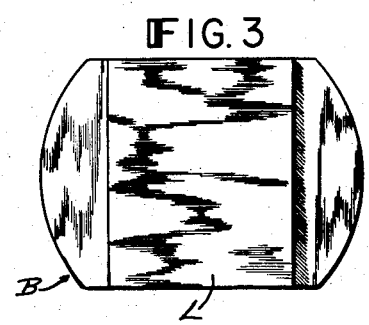
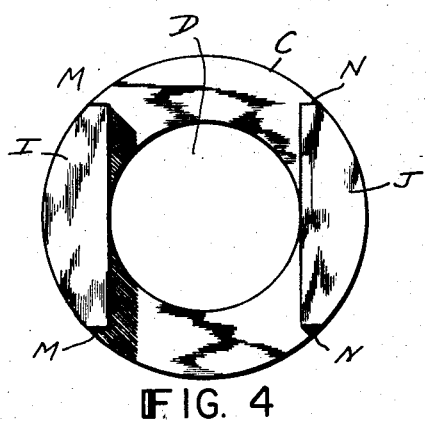
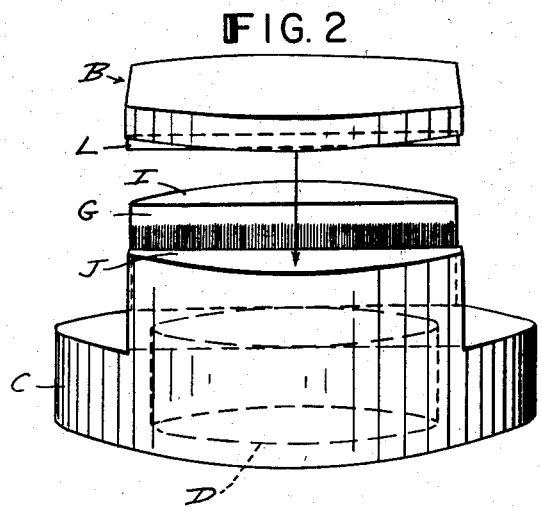
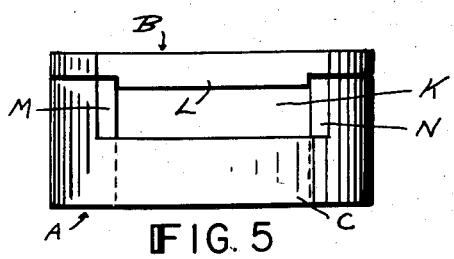
INVENTOR.
JOHN W. PARFITT

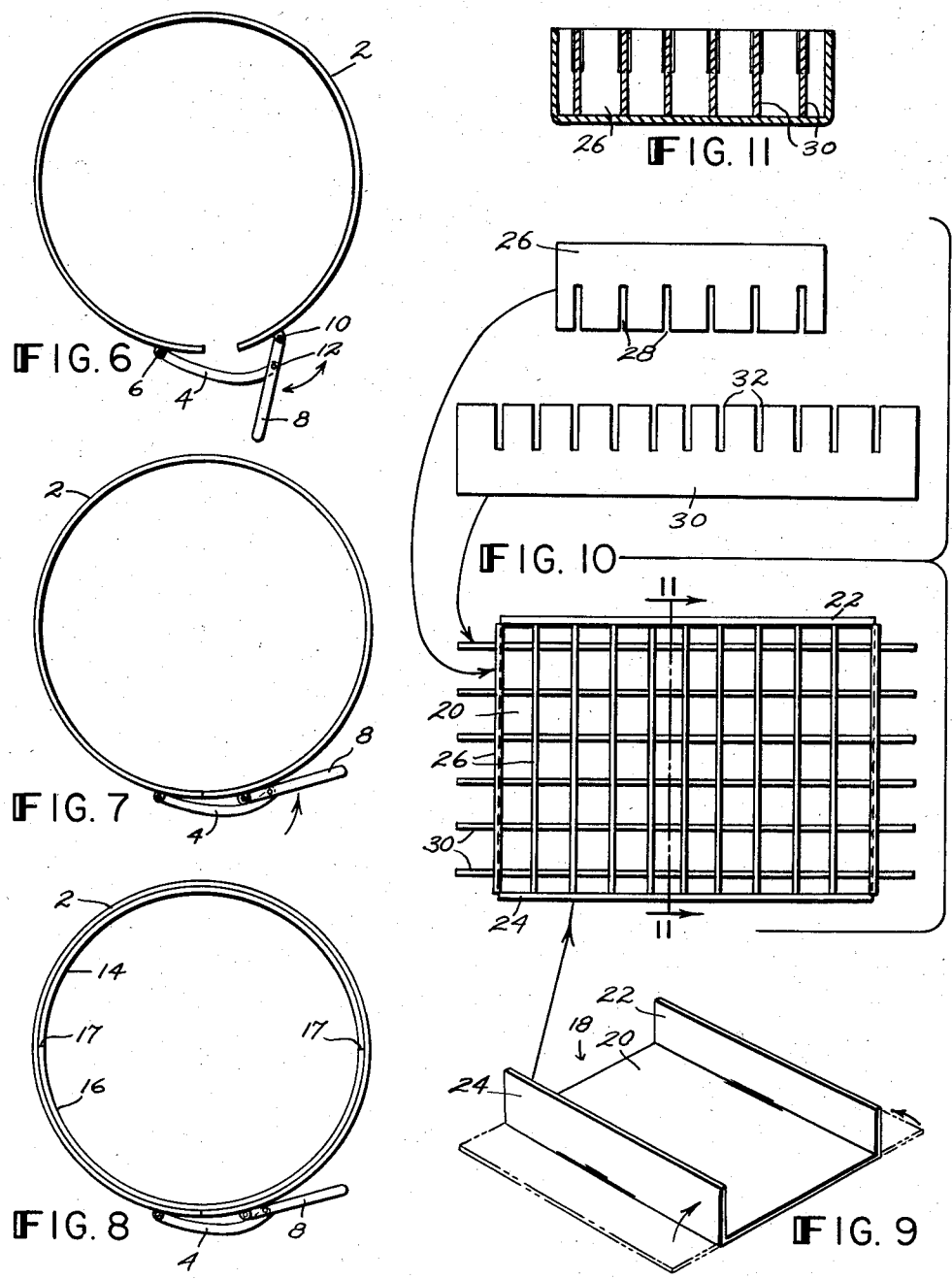

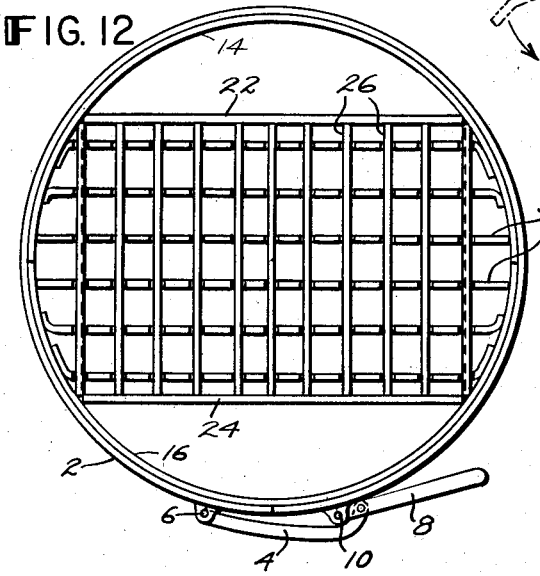
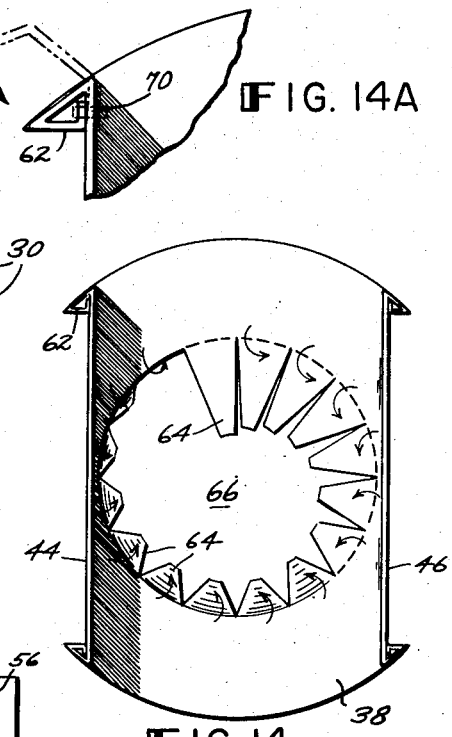
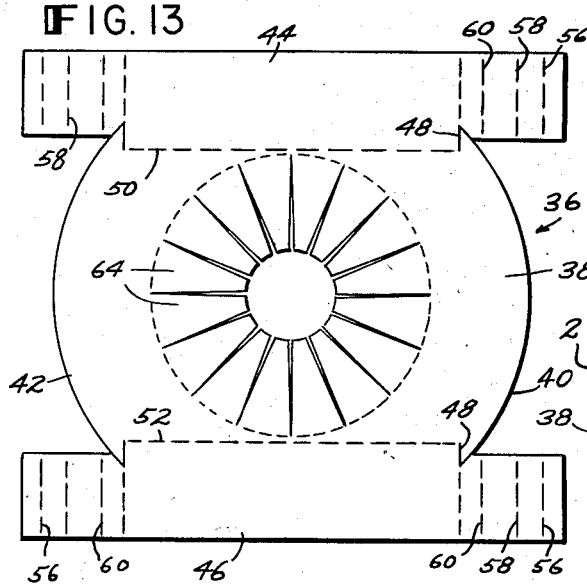
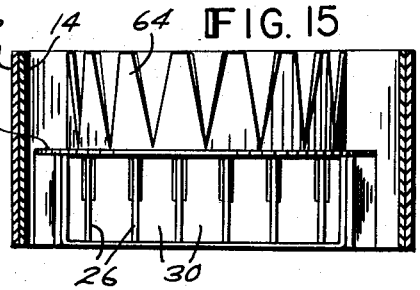

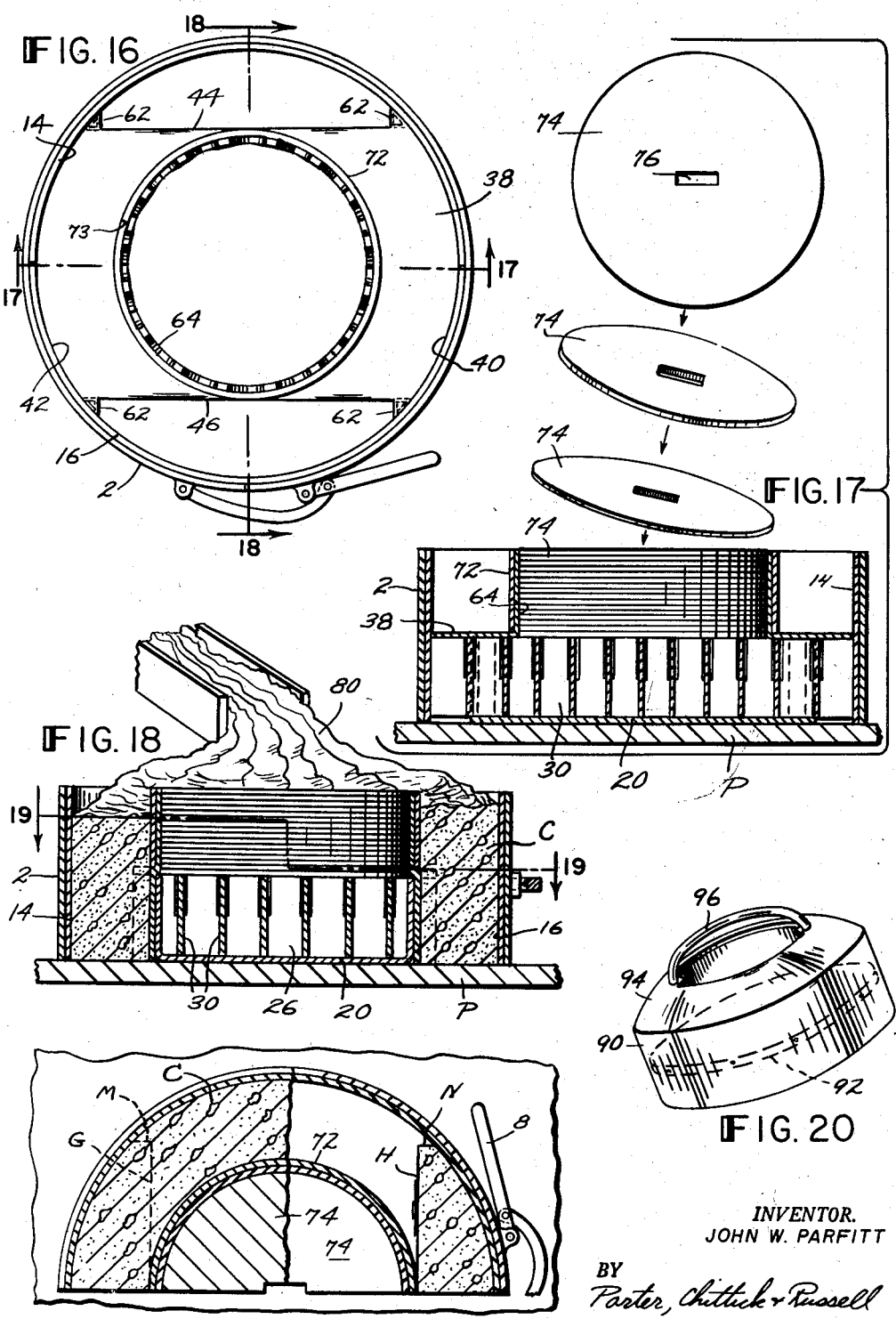

2,870,515

MOLD ASSEMBLY FOR MANUFACTURING CONCRETE INLET TOPS FOR STORM DRAINS

John William Parfitt, Manchester, N. H.

Application September 19, 1957, Serial No. 685,027

9 Claims. (Cl. 25—118)

This invention relates to the art of molding concrete products and more particularly to novel apparatus for molding inlet tops for storm drains and the like.

Heretofore inlet tops for storm drains have been manufactured in special molds made of steel or wood. Both types of molds have been unsatisfactory. Steel molds are expensive, heavy, and difficult to assemble and disassemble. Wooden molds are difficult to assemble and disassemble and can be re-used only a limited number of times. At the same time considerable care is required in stripping the molds away from the hardened concrete in order to prevent portions of the molded concrete from being pulled away. In practice it is quite common for the molded article to be damaged when the mold is disassembled. Still a further objection resides in the fact that the use of wooden forms restricts the molded article to a simple polygonal shape.

Accordingly it is the object of this invention to provide a new form of mold for concrete products and more particularly a new form of mold for molding inlet tops for storm drains.

A more specific object of this invention is to provide apparatus for molding concrete inlet tops for storm drains comprising mold elements made of cardboard and so assembled as to withstand buckling under the loading pressures of concrete mix.

Other objects and many of the attendant advantages of this invention will become readily apparent as reference is had to the following detailed description when considered together with the accompanying drawings wherein:

Figs. 1 to 5 illustrate an inlet top for storm drains manufactured in a mold constructed according to the present invention;

Figs. 6 and 7 illustrate in open and closed position respectively the steel split ring which functions to support the outer cardboard wall of the mold;

Fig. 8 illustrates two semi-circular cardboard rings lining the inner surface of the steel ring of Figs. 6 and 7;

Fig. 9 illustrates a U-shaped channel member forming part of the mold insert;

Fig. 10 illustrates a lattice-work and the elements thereof which also form part of the mold insert;

Fig. 11 is a vertical section taken along line 11—11 of Fig. 10;

Fig. 12 illustrates the sub-assembly of Fig. 11 disposed within the sub-assembly of Fig. 8;

Fig. 13 illustrates a blank die-cut from cardboard adapted to be folded to form another element of the insert assembly;

Fig. 14 is a bottom view illustrating how the blank of Fig. 13 is folded;

Fig. 14a is an enlarged view of a detail of the construction of Fig. 14;

Fig. 15 illustrates the folded blank of Fig. 14 added to the sub-assembly of Fig. 12 with the outer metal ring and the cardboard liner broken away to present an end view of the mold insert;

Fig. 16 is a plan view of the assembly of Fig. 15;

Fig. 17 is a sectional view in elevation taken along lines 17—17 of Fig. 16 illustrating the addition of reinforcing disks to the mold insert;

Fig. 18 is a sectional view in elevation taken along line 18—18 of Fig. 16 illustrating how the mold cavity is filled with concrete;

Fig. 19 is a horizontal section taken along line 19—19 of Fig. 18; and

Fig. 20 is a perspective view illustrating a reinforcing element adapted to be used in lieu of the reinforcing disks illustrated in Figs. 17 and 18.

Referring to Figs. 1 to 5 there is shown a concrete inlet top A for storm drains produced with the mold assembly of the present invention. Also illustrated is a concrete cover B for the inlet top. The mold for making the cover B is simple to construct and forms no part of the present invention.

The inlet top A is of cylindrical configuration and comprises an annular body portion C having a circular central opening D and two upstanding diametrically opposed sections comprising curved outer surfaces E and F which are continuations of the outer curved surface of the body portion C and two straight parallel inner surfaces G and H formed tangent to the opening D. The top surfaces I and J are flat and horizontal. The inner surfaces G and H define a U-shaped channel K open at the top which is closed by the separate cover B which rests on the horizontal surfaces I and J and has a depending portion L which seats between the vertical surfaces G and H. It is to be noted that the corners formed by the outer curved surfaces E and F with the inner vertical surfaces G and H respectively are cut back or bevelled so as to form flat surfaces M and N.

The elements of the mold assembly used to produce the inlet top of Figs. 1 to 5 and the manner of assembling the elements are described hereinafter.

Referring now to Figs. 6 and 7, there is illustrated a split ring or band 2 formed of steel provided with a toggle locking mechanism comprising a lever 4 pivoted at 6 to one end of the steel ring 2 and another lever 8 pivoted at one end as at 10 to the other end of the steel ring. The opposite end of the lever 4 is pivoted at 12 to the lever 8. When the lever 8 is rotated counter-clockwise from the position of Fig. 6 to the position of Fig. 7, the ends of the steel ring will be forced together and will be locked in closed position when the pivot point 12 passes beyond a straight line drawn between the pivots 6 and 10.

Starting with the steel ring 2 which is usually positioned on a steel platform or pallet P as shown in Figs. 17 and 18, a cardboard liner is inserted within the steel ring. Fig. 8 shows a cardboard liner formed of two strips of cardboard 14 and 16 resting up against the inner surface of the metal ring. The ends of the two strips of cardboard abut each other as at 17. It is to be understood that the two strips 14 and 16 may be replaced by a single strip of cardboard, if desired.

The steel ring 2 and the liners 14 and 16 define a cylindrical cavity in which is positioned a mold insert formed from several cardboard elements described hereinafter. Looking at Figs. 9 through 12, there is shown a cardboard member 18 adapted to be folded to form U-shaped channel defined by a large horizontal body portion 20 provided at its side edges with upturned side walls 22 and 24. The channel member 18 is adapted to receive a lattice-work formed from cardboard elements 26 provided with slots 28 cut in their upper edges and cardboard elements 30 provided with similar slots 32 in their lower edges. The cardboard elements 30 are positioned in parallel spaced relation and held in this position by the cardboard elements 26 whose slots receive the body portions of the strips 30. This lattice-work is positioned within the U-shaped channel with the sides 22 and 24 of the channel embracing the ends of the strips 26. This sub-assembly is positioned within the mold cavity with the body portion 20 of the U-shaped channel disposed horizontally beneath the sections 26 and 30. The ends of the strips 30 are bent as shown in Fig. 12 to conform to the cylindrical configuration of the rings.

Also forming part of the mold insert is a cardboard element 36 which is die-cut from a rectangular blank of cardboard. The element 36 is generally H-shaped and comprises a central floor portion 38 connected to two leg portions 44 and 46. The opposed edges 40 and 42 of the central portion 38 are of circular curvature and are drawn on a radius only slightly smaller than the radius of the inside surface of the liner elements 14 and 16. The opposed legs 44 and 46 are identical. These legs are slotted as at 48 and the central portion 38 is scored defining respective side edges at 50 and 52 so that the legs 44 and 46 can be bent relative to the central portion to form parallel vertical side walls as shown in Fig. 14. The ends of the legs 44 and 46 are scored as at 56, 58 and 60 so that the ends of the blanks may be bent in the form of a triangle as shown at 62 in Figs. 14 and 14a. The folded ends of the legs form supports for the ends of the circular edges 40 and 42 of the central portion of the blank. The central portion of the blank is die-cut to form a series of radially extending sector-shaped tongues 64 which can be folded back as illustrated in Fig. 14 to define a circular opening 65 having a diameter only slightly less than the distance between score lines which define respective side edges 50 and 52. The ends of the legs of the blank are maintained in folded triangular position by means of pressure sensitive tape 70 applied as illustrated in Fig. 14a. Once the blank has been folded as shown in Fig. 14, it is placed over the lattice-work assembly as shown in Figs. 15 and 16 so that the floor portion 38 functions as a horizontal wall located between the upper and lower edges of metal band 2 as shown in Fig. 17. The curved edges 40 and 42 snugly engage the inner surface of the liner elements 14 and 16 and the sides 44 and 46 snugly engage the sides 22 and 24 of the channel member, being held in vertical position by virtue of the engagement made by their triangularly folded ends 62 with the inner surface of the ring liners 14 and 16 as shown in Fig. 16.

With the sector shaped tongues 64 bent upward as shown in Fig. 15, a cardboard ring 72 is placed beyond the sectors so as to prevent them from moving outward. The ring 72 preferably takes the form of a strip which is folded in the shape of a circle and has its ends butted together as at 73. Preferably the ends 73 of ring 72 are stapled to the sectors 64. In order to hold the sector shaped tongues up against the cardboard ring 72, it is necessary to add reinforcing means such as cardboard disks 74 illustrated in Figs. 17 and 18. These cardboard disks are provided with central slots 76 so that they may be readily grasped and removed. The disks 74 cooperate with the sector shaped tongues 64, and the ring 72 to form a sturdy stationary cylindrical extension for the mold insert capable of withstanding the loading pressures of the concrete mix to be applied to the mold. With the addition of the ring 72 and the disks 74, the mold is complete.

Thereafter concrete mix 80 is added to the mold in sufficient quantity to fill all of the voids up to the level of the metal ring 2. After the concrete mix has hardened, the toggle lever 8 is operated to open the metal ring 2 so that the latter may be removed. Thereafter the liner elements 14 and 16 and the other cardboard members of the mold are also removed, leaving the finished article conforming in shape to the article illustrated in Figs. 1 to 5. In Figs. 18 and 19 the same letters are used as in Figs. 1 to 5 to designate corresponding parts of the molded article. It is to be noted that the article is molded upside down and that the surfaces M and N are produced by the triangularly bent portions 62 of the legs 44 and 46 of blank 36.

To facilitate operations, it is also contemplated to replace the disks 74 with a cylindrical metal plug (see Fig. 20) formed of sheet metal. The metal plug consists of a cylindrical wall 90 closed at the bottom and reinforced on its interior by a circular disk 92. Disk 92 is welded to the inside surface of wall 90. Also welded to the wall 90 is a tapered wall section 94 which is provided with a fixed handle 96. This plug element is strong and light and is readily removed by grasping the handle 96.

In practicing this invention, it has been found that corrugated cardboard having a thickness of 3/8 of an inch has suitable strength when utilized in the manner above described. However, the disks 74 may be of greater thickness, e. g. 5/8 of an inch so as to reduce the number of disks necessary to fill the cylindrical opening defined by the tongues 62. It is to be noted that the cardboard lattice-work provides adequate support for the central portion 38 of the mold insert. Similarly the lattice-work fully supports the sides of the channel member and the sides 44 and 46 of the blank 36. The ring 72 increases the diameter of the cylindrical extension of the mold insert so as to make the walls 44 and 46 tangent to the cylindrical extension. The height of the cylindrical extension is the same as the height of liners 14 and 16, and the latter extend above the supporting pallet P to a height exactly the same as the over-all height of the inlet top. Thus after filling the mold, it is an easy matter to pass a board or scraper over the mold to level off the concrete mix flush with th top of the liner rings.

Removal of the mold elements from the molded article is a simple matter, taking only a few minutes to complete. The cardboard elements that are in direct contact with the concrete can be recovered if they have been coated previously with a suitable mold release compound. However, since they are relatively cheap, and because mold release compounds are relatively expensive, it is preferred to consider them expendable and to strip them from the hardened concrete without attempting to prevent them from tearing. It has been found that the cardboard elements should have a wax coating. The wax makes them impervious to water so that they will not be wet by the fresh mix. If the cardboard elements are not waxed, the water content of the concrete mix will be absorbed and will weaken the cardboard elements. The wax coating is also a convenient substitute for the mold release compound so that only minor portions, if any, of the cardboard elements will remain stuck to the hardened concrete when the elements are removed. The minor portions which adhere to the molded article are easily peeled off if they are first flushed with water.

It is to be noted also that the U-shaped channel member 18 is not absolutely necessary, but is employed since it contributes to the sturdiness of the mold insert and helps to attain smooth walls G and H.

It is to be noted also that the surfaces M and N are not necessary and that the surfaces G and H can be made to terminate flush with the surfaces E and F by suitably modifying the construction of the die cut blank 36. Similarly, the height and diameter of the finished article can be modified by changing the sizes of the various elements of the mold assembly.

Obviously many modifications and variations of the present invention are possible in the light of the above teachings. Therefore, it is to be understood that the invention is not limited in its application to the details of construction and arrangement of parts specifically described or illustrated, and that within the scope of the appended claims it may be practiced otherwise than as specifically described or illustrated.

I claim:

1. A mold for forming inlet tops for storm drains comprising a horizontal platform, a cylindrical steel band resting on said platform, said band having upper and lower edges and an inner surface, a cardboard cylinder lining the inner surface of said steel band said cardboard cylinder having an inner surface defining a mold cavity, a mold insert positioned in said cavity, said insert being formed of cardboard and comprising a horizontal floor having a top side and bottom side disposed between the upper and lower edges of said band, said floor having straight parallel side edges forming chords of the circle defined by said band and circularly curved end edges, said curved end edges abutting the inner surface of said cardboard liner, a vertical side wall formed integral with said horizontal floor along each side edge thereof, said side walls extending down from said horizontal floor to said platform, a lattice-work supporting said horizontal floor, said lattice work being positioned beneath said horizontal floor between said side walls, and a cylindrical cardboard ring having outer and inner surfaces secured to the top side of said horizontal floor in concentric relation to said band, the outer surface of said cylindrical cardboard ring being tangent to said side walls, and means on the inside of said cylindrical cardboard ring for preventing inward buckling of said cylindrical cardboard ring when said mold cavity is filled with concrete mix.

2. A mold assembly as defined by claim 1, wherein said steel band is split and further including releasable means preventing separation of said split band.

3. A mold assembly as defined by claim 1, wherein said horizontal floor and said side walls are formed from a single flat sheet of cardboard.

4. A mold assembly as defined by claim 1, further including radially disposed upstanding tongues on the inside of said cylindrical cardboard ring cut from the center of said horizontal floor and bent upwardly therefrom, said tongues being attached to said cylindrical cardboard ring.

5. A mold assembly for use in making concrete inlet tops for storm drains comprising a circular metal ring having an inner surface, a cardboard cylinder positioned within and engaging the inner surface of said metal cylinder, said cardboard ring having an inner surface defining a mold cavity, a mold element formed of corrugated cardboard positioned within said cavity, said mold element comprising a reinforced body portion having parallel vertically extending oppositely-disposed side walls forming chords of the circle defined by said cardboard cylinder, said body portion also comprising a horizontal floor having opposite side edges joined to said side walls and opposite curved end edges engaging the inner surface of said carboard cylinder, said body portion also having a cylindrical ring located concentric to said cardboard cylinder extending up from said horizontal floor, and means disposed within said cylindrical ring supporting said cylindrical ring against buckling under the load of concrete resting on said horizontal floor.

6. A mold assembly as defined by claim 5, wherein said mold element is formed of corrugated cardboard.

7. A mold assembly as defined by claim 6, wherein said corrugated cardboard has a minimum thickness of ⅜" and has waxed surfaces.

8. A mold assembly for use in making inlet tops for drains from a concrete mix, said assembly comprising a flat supporting platform, a metal ring supported on said platform, said metal ring having an inner surface, a liner formed of cardboard and having top and bottom edges disposed within said ring in engagement with the inner surface thereof, said liner having an inner surface defining a circular mold cavity and a mold insert formed of cardboard positioned within the cavity defined by said liner, said mold insert comprising a horizontal floor portion positioned below the top edge of said liner having arcuate oppositely disposed end edges engaging said liner and oppositely disposed parallel straight side edges forming chords of the circle described by said liner, first and second vertical side walls extending from said supporting platform up to said floor portion, said side walls being formed integral with said floor portion at said side edges, a lattice-work of cardboard strips positioned on said supporting platform between said side walls in supporting relation to said floor portion, and a cylindrical ring extending up from said floor portion, said cylindrical ring being disposed in concentric relation to said metal ring and in tangential relation with said side edges.

9. A mold assembly as defined by claim 8, further including radially extending tongues cut from the center of said floor portion and bent upward inside of said cylindrical ring, and circular means holding said tongues in engaging relation with said cylindrical ring.

References Cited in the file of this patent

UNITED STATES PATENTS 2,681,495   Killian et al. _____ June 22, 1954